(12) United States Patent
Natu

(10) Patent No.: US 11,216,404 B2
(45) Date of Patent: Jan. 4, 2022

(54) MECHANISM FOR DEVICE INTEROPERABILITY OF SWITCHES IN COMPUTER BUSES

(71) Applicant: Intel Corporation, Santa Clara, CA (US)

(72) Inventor: Mahesh Natu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/673,259

(22) Filed: Nov. 4, 2019

(65) Prior Publication Data

US 2020/0065290 A1 Feb. 27, 2020

Related U.S. Application Data

(60) Provisional application No. 62/882,863, filed on Aug. 5, 2019.

(51) Int. Cl.
*G06F 13/42* (2006.01)
*H04L 12/40* (2006.01)

(52) U.S. Cl.
CPC .... *G06F 13/4221* (2013.01); *H04L 12/40097* (2013.01)

(58) Field of Classification Search
CPC ........... G06F 13/4221; H04L 12/40097; H04L 12/40013
See application file for complete search history.

(56) References Cited

U.S. PATENT DOCUMENTS

| 7,783,818 | B1 * | 8/2010 | Sardella | G06F 13/409 710/313 |
| 7,860,930 | B2 * | 12/2010 | Freimuth | G06F 13/4022 709/205 |
| 7,917,658 | B2 * | 3/2011 | Pettey | H04L 12/4633 710/2 |
| 10,394,747 | B1 * | 8/2019 | Paneah | G06F 13/404 |

(Continued)

OTHER PUBLICATIONS

Arimilli, Baba et al. "The PERCS High-Performance Interconnect." 2010 18th IEEE Symposium on High Performance Interconnects. Aug. 18-20, 2010. DOI: 10.1109/HOTI.2010.16 (Year: 2010).*

*Primary Examiner* — Idriss N Alrobaye
*Assistant Examiner* — Henry W Yu
(74) *Attorney, Agent, or Firm* — Schwabe, Williamson & Wyatt, P.C.

(57) ABSTRACT

Apparatuses, methods, and computer-readable media are provided for operating a port manager to detect a first link condition or a second link condition of a circuitry. Under the first link condition, a first link between a downstream port of the circuitry and an upstream port of a switch is compatible to a first protocol, and a second link between a downstream port of the switch and an upstream port of a device is compatible to the second protocol. Under the second link condition, the first link exists and is compatible to the first protocol, while there is no second link being compatible to the second protocol. The port manager is to operate the downstream port of the circuitry according to the second protocol on detection of the first link condition, or according to the first protocol on detection of the second link condition. Other embodiments may be described and/or claimed.

15 Claims, 8 Drawing Sheets

(56) References Cited

U.S. PATENT DOCUMENTS

| | | | |
|---|---|---|---|
| 2004/0179529 A1* | 9/2004 | Pettey | G06F 13/12 370/392 |
| 2008/0239945 A1* | 10/2008 | Gregg | G06F 11/2005 370/217 |
| 2013/0151750 A1* | 6/2013 | Kanigicherla | G06F 13/4022 710/313 |
| 2013/0179604 A1* | 7/2013 | Lai | G06F 11/3068 710/16 |
| 2013/0205053 A1* | 8/2013 | Harriman | G06F 13/4022 710/105 |
| 2013/0254440 A1* | 9/2013 | Toivanen | G06F 13/105 710/63 |
| 2014/0143472 A1* | 5/2014 | More | G06F 3/0604 710/316 |
| 2015/0227485 A1* | 8/2015 | Maung | G06F 13/4022 710/316 |
| 2016/0378971 A1* | 12/2016 | Dunstan | G06F 13/102 726/17 |
| 2017/0017585 A1* | 1/2017 | Iyer | G06F 13/4282 |
| 2017/0177509 A1* | 6/2017 | Kambara | G06F 13/4221 |
| 2019/0310913 A1* | 10/2019 | Helmick | G06F 11/1076 |

* cited by examiner

MECHANISM FOR DEVICE INTEROPERABILITY OF SWITCHES IN COMPUTER BUSES

RELATED APPLICATIONS

The present application claims priority under 35 U.S.C. § 119 to U.S. Provisional Application No. 62/882,863 filed on Aug. 5, 2019, the contents of which are hereby incorporated by reference in their entireties.

FIELD

Various embodiments generally may relate to the field of communication and computing, and in particular, may relate to a computer bus and devices coupled by a computer bus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computer system, or a platform, may include many components, such as a host including a central processing unit (CPU), memory, chipsets, and/or many other devices coupled together by a computer bus. A computer bus is a communication system that may transfer data between devices or components inside a computer, or between computers. A computing system or a platform may use various devices coupled to a computer bus extensively. A computer bus may include related hardware components (wire, optical fiber, etc.) and software, including communication protocols. There may be many kinds of computer bus, such as serial buses or parallel buses.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
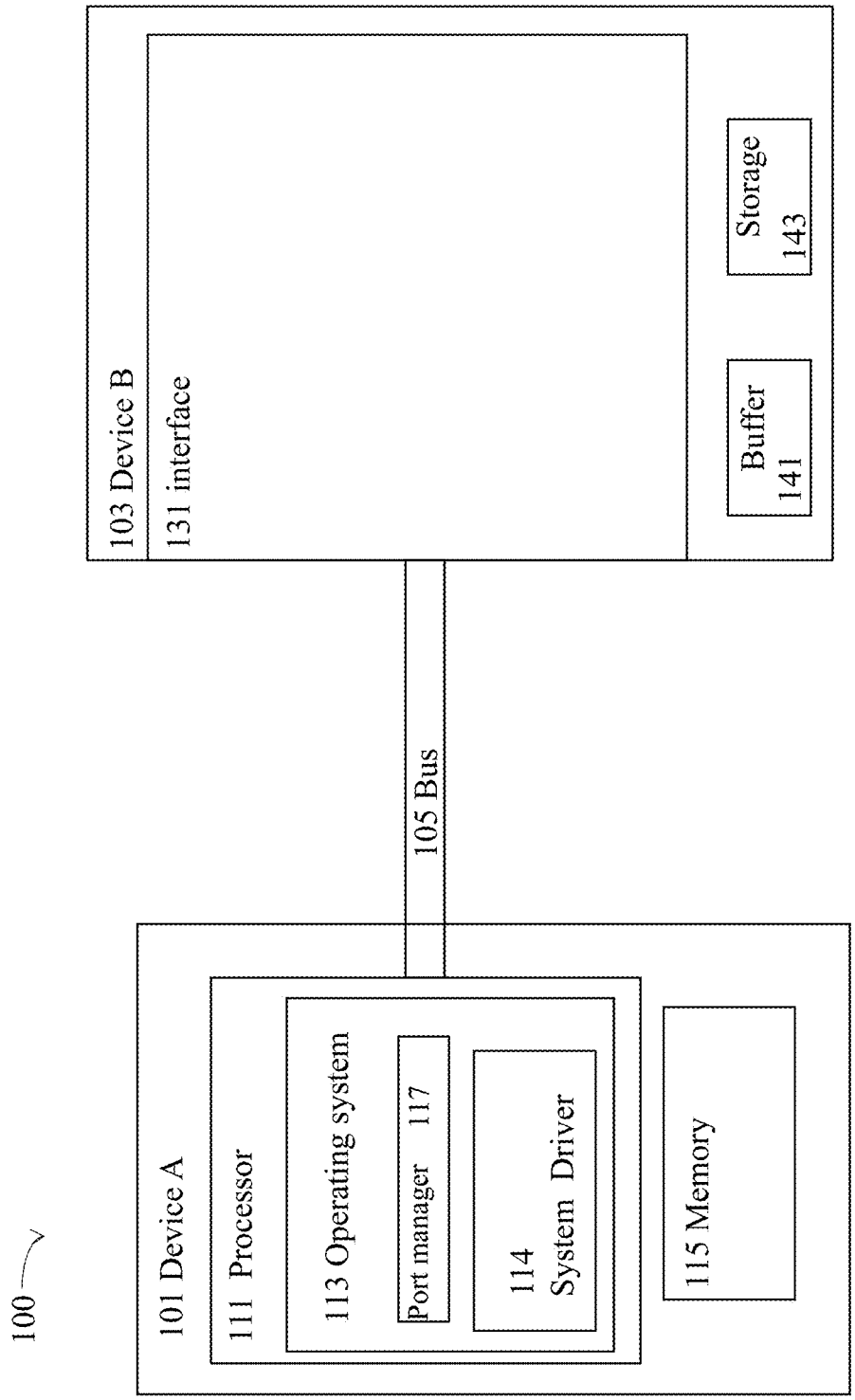
FIG. 1 illustrates an example apparatus including a device coupled to another device by a computer bus, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

A computing system or a platform may use various devices coupled to a computer bus extensively. A computer bus may include related hardware components (wire, optical fiber, etc.) and software, including communication protocols. A peripheral component interconnect (PCI) bus or a PCI Express (PCIe, PCI-E) may be a computer bus based on a specification that provides a mechanism for system software, or a system driver, to perform various operations related to the configuration of a device coupled to the PCI bus or the PCIe bus. Devices, or components coupled to a computer bus may also be referred to as functions. PCIe may operate in consumer, server, and industrial applications, as a motherboard-level interconnect (to link motherboard-mounted peripherals), a passive backplane interconnect, and as an expansion card interface for add-in boards. PCIe devices communicate via a logical connection called an interconnect or link. A link is a point-to-point communication channel between two PCIe ports allowing both of them to send and receive ordinary PCI requests, e.g., configuration, input/output (I/O), or memory read/write, and interrupts. At the physical level, a link may be composed of one or more lanes. Low-speed peripherals, such as an 802.11 Wi-Fi card, use a single-lane (×1) link, while a graphics adapter typically uses a much wider and faster 16-lane link.

Compute Express Link (CXL) is an industry high-speed interconnect standard for a computer bus. Devices may be made based on different generations of CXL standard, e.g., CXL 1.0 devices, CXL 1.1 devices, CXL 2.0 devices, any other CXL family devices, or more. Devices based on different generations of CXL standard may have some differences in their functions or architectures. For example, CXL 2.0 devices may include CXL switches, which may not be available in previous generation of CXL devices. Multiple CXL 2.0 switches may be nested. In addition, CXL 2.0 switches also produce PCIe ports. On the other hand, CXL 1.0 devices are designed to prioritize legacy software (SW) compatibility over extensibility. As such, a CXL 1.0 device or a CXL 1.1 device appears as PCIe specification compliant Root Complex Integrated Endpoint (RCiEP). As a result, a CXL 1.0 device or a CXL 1.1 device may not be able to attach to a CXL 2.0 switch to function properly.

In the description below, a PCI bus or a PCIe bus may refer to any bus in the PCI family, while a CXL bus may refer to any bus in the CXL family. Furthermore, a PCI bus or a CXL bus may be used as an example of a computer bus. Similarly, a PCI device, a PCIe device, or a CXL device may be used as an example of a device coupled to a computer bus. Descriptions about a PCIe device, a PCIe device, or a CXL device may be applicable to any other device coupled to any computer bus.

Embodiments disclosed herein include an apparatus for communication, where the apparatus having circuitry including a port manager and a downstream port. The port manager is to detect a first link condition or a second link condition of the circuitry. Under the first link condition, a first link between the downstream port of the circuitry and an upstream port of a switch coupled with the circuitry is compatible to a first protocol, and a second link between a downstream port of the switch and an upstream port of a device coupled to the switch is compatible to the second protocol. Under the second link condition, the first link between the downstream port of the circuitry and the upstream port of the switch exists and is compatible to the first protocol. However, there is no second link being compatible to the second protocol between the downstream port of the switch and the upstream port of the device. On detection of the first link condition, the port manager is to operate the downstream port of the circuitry according to the second protocol. Furthermore, on detection of the second link condition, the port manager is to operate the downstream port of the circuitry according to the first protocol.

In some embodiments, an apparatus for communication includes a switch having a port manager, an upstream port, and a downstream port. The port manager is to detect a first link condition or a second link condition of the switch. Under the first link condition, a first link between the upstream port of the switch and a downstream port of a circuitry coupled to the switch is compatible to a first protocol, and a second link between the downstream port of the switch and an upstream port of a device coupled to the switch is compatible to a second protocol. Under the second link condition, the first link between the downstream port of the circuitry and the upstream port of the switch is compatible to the first protocol. However, there is no second link being compatible to the second protocol between the downstream port of the switch and the upstream port of the device. On detection of the first link condition, the port manager is to operate the upstream port of the switch and the downstream port of the switch according to the second protocol. Furthermore, on detection of the second link condition, the port manager is to operate the upstream port of the switch according to the first protocol.

In some embodiments, an apparatus for computing includes a printed circuit board (PCB) having a first link and a second link selected from a PCI bus, a PCI Extended bus (PCI-X), a PCI express bus, a CXL 1.0 bus, a CXL 1.1 bus, or a CXL 2.0 bus. The PCB also has a root complex including a port manager and a downstream port, and a switch coupled to the root complex and including an upstream port, and a downstream port. The port manager of the root complex is to detect a first link condition or a second link condition of the root complex. Under the first link condition, a first link between the downstream port of the root complex and the upstream port of the switch is compatible to a first protocol, and a second link between the downstream port of the switch and an upstream port of a device is compatible to a second protocol. Under the second link condition, the first link between the downstream port of the root complex and the upstream port of the switch is compatible to the first protocol. However, there is no second link being compatible to the second protocol between the downstream port of the switch and the upstream port of the device. On detection of the first link condition, the port manager is to operate the downstream port of the root complex according to the second protocol. Furthermore, on detection of the second link condition, the port manager is to operate the downstream port of the root complex according to the first protocol.

In some embodiments, the apparatus for computing may add registers with memory mapped input-output (MMIO) address space and a bus range decoder to CXL 2.0 root ports of the root complex and the switch. In addition, the port manager configures these decoders to create an appearance that a CXL 1.1 device attached in a CXL 2.0 switch hierarchy is a peer device to the root complex, e.g., RCiEP. Such an appearance is possible due to the creation of a communication channel between the CXL 2.0 root port of the root complex and an upstream port of the CXL 1.1 device through the switch. In some embodiments, the communication channel between the CXL 2.0 root port and the CXL 1.1 device includes dedicated registers and buses in the root complex and the switch to be used for the communication channel. Furthermore, the CXL 2.0 switch ports operate in CXL 1.1 like mode e.g. routing of error messages, port registers when it detects a 1.1 device below. Embodiments herein may provide greater selection of CXL devices and better user experience.

Various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. The term "RSU" may refer to any transportation infrastructure entity implemented in an gNB/eNB or a stationary (or relatively stationary) UE. An RSU implemented in a UE may be referred to as a "UE-type RSU" and an RSU implemented in an eNB may be referred to as an "eNB-type RSU." As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example apparatus 100 including a device 101, e.g., a host, coupled to another device 103 by a computer bus 105, in accordance with various embodiments. The device 101 includes a port manager 117. For clarity, features of the apparatus 100, the device 101, the device 103, and the computer bus 105, are described below as an example. It is to be understood that there may be more or fewer components included in the apparatus 100, the device 101, the device 103, and the computer bus 105. Further, it is to be understood that one or more of the devices and components within the apparatus 100 may include additional and/or varying features from the description below, and may include any device that one having ordinary skill in the art would consider and/or refer to as a host, a device, and a computer bus. In some embodiments, the computer bus 105 may be a CXL interconnect, while the device 101 and the device 103 may be any two devices, e.g., a circuitry, a switch, or a device, within an apparatus 200 for communication shown in FIG. 2. The port manager 117 may be an example of a port manager 211 or a port manager 236 shown in FIG. 2.

In embodiments, the device 101 may include the processor 111 and a memory 115. An operating system 113 may operate on the processor 111, and may include a system driver 114 and the port manager 117. The device 103 may be coupled to the processor 101 by the computer bus 105. The device 103 may include an interface 131 coupled to the computer bus 105, a buffer 141, and a storage 143. The interface 131 may include one or more registers, such as a capability header register, an authentication header register, an authentication capability register, an authentication status register, an authentication control register, a write data mailbox register, a read data mailbox register, or some other registers.

In embodiments, the apparatus 100 may be any computing system or platform, for example, a laptop computer, an ultra-laptop computer, a tablet, a touch pad, a portable computer, a handheld computer, a wearable device, a palmtop computer, a personal digital assistant (PDA), an e-reader, a cellular telephone, a combination cellular telephone/PDA, a mobile smart device (e.g., a smart phone, a smart tablet, etc.), a mobile internet device (MID), a mobile messaging device, a mobile data communication device, a mobile media playing device, a camera, a mobile gaming console, etc. In embodiments, the apparatus 100 may also be a non-mobile device that may include, but is not to be limited to, for example, a personal computer (PC), a television, a smart television, a data communication device, a media playing device, a gaming console, a gateway, an Internet of Things (JOT) device, etc. The apparatus 100 may include controllers (or processors) and other components that execute software and/or control hardware to execute local programs or consume services provided by external service providers over a network. For example, the apparatus 100 may include one or more software clients or applications that run locally and/or utilize or access web-based services (e.g., online stores or services, social networking services, etc.). The apparatus 100 may also, or instead, include a web interface running in a browser from which the electronic apparatus can access such web-based services. The apparatus 100 may also include storage devices to store logic and data associated with the programs and services used by the apparatus 100.

In embodiments, the processor 111 may be a central processing unit (CPU). In some embodiments, the processor 111 may be a programmable device that may execute a program, e.g., the system driver 114. In embodiments, the processor 111 may be a microcontroller, a 16-bit processor, a 32-bit processor, a 64-bit processor, a single core processor, a multi-core processor, a digital signal processor, an embedded processor, or any other processor.

In embodiments, the operating system 113 may be any system software that manages hardware or software resources for the apparatus 100, and may provide services to applications, e.g., the system driver 114. The operating system 113 may be Windows®, Android OS, iOS, Linux, a real-time operating system (RTOS), an automotive infotainment operating system, among others. For example, the operating system 113 may be a real-time operating system such as VxWorks, PikeOS, eCos, QNX, MontaVista Linux, RTLinux, Windows CE, or other operating system.

In embodiments, the computer bus 105 may be an external computer bus, an internal computer bus, a serial computer bus, or a parallel computer bus. For example, the computer bus 105 may be a PCI bus, a PCI Extended bus (PCI-X), a PCI express bus, a universal serial bus (USB), a parallel advanced technology attachment (PATA) bus, a serial ATA (SATA) bus, an inter-integrated circuit ($I^2C$) bus, an IEEE 1394 interface (FireWire) bus, a small computer system interface (SCSI) bus, a scalable coherent interface (SCI) bus, or other computer bus.

In embodiments, the device 103 may be any piece of computer hardware. For example, the device 103 may be a network interface card, an audio card, a video controller, an Ethernet controller, a webcam, mouse, a Bluetooth controller, a PCI to ISA bridge, a GUI Accelerator, an ATM Controller, a multimedia card, a SCSI controller, a multimedia device, a MPEG-II Video Decoder, or any input/output device. In embodiments, the device 103 may be a PCI device, which may be plugged directly into a PCI slot on a computer's motherboard. In some other embodiments, the device 103 may be coupled to the processor 111 by a different computer bus.

Figure 2:
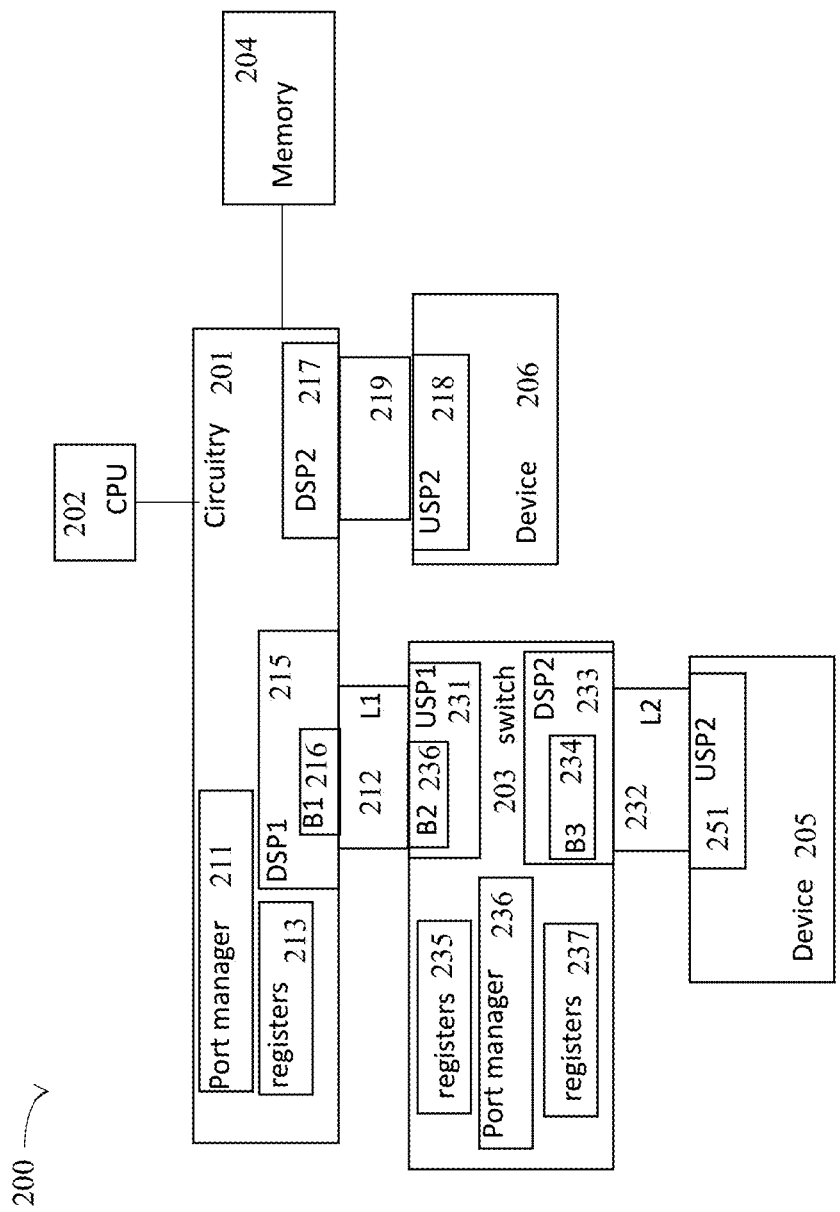
FIG. 2 illustrates an example apparatus for communication including a port manager to manage a communication channel between a downstream port of a circuitry and an upstream port of a device through a switch, in accordance with various embodiments.
Figure 3:
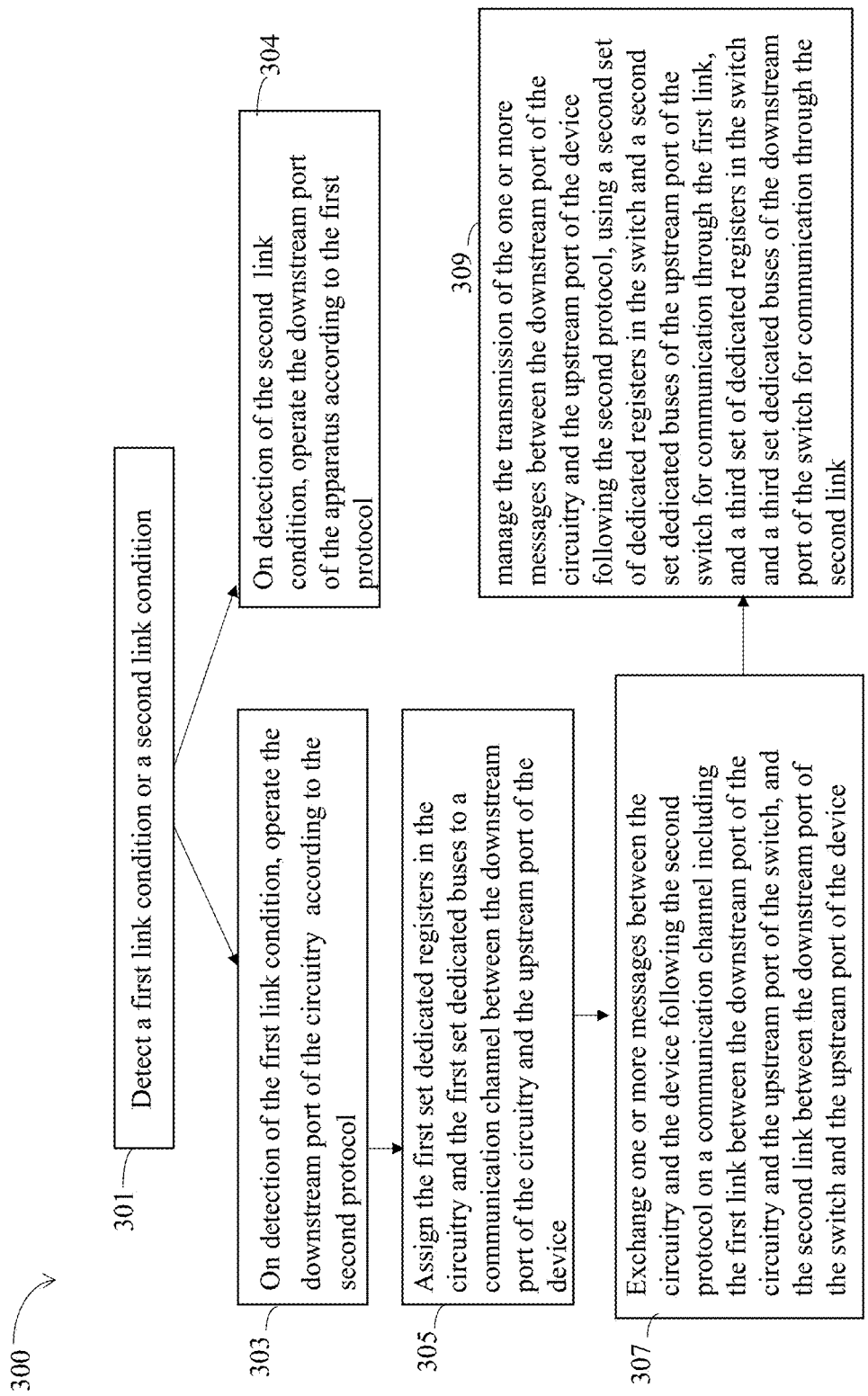
FIG. 3 illustrates an example process performed by a port manager to manage a communication channel between a downstream port of a circuitry and an upstream port of a device through a switch, in accordance with various embodiments.

FIG. 2 illustrates the example apparatus 200 for communication including a port manager 211 to manage a communication channel between a downstream port 215 of a circuitry 201 and an upstream port 251 of a device 205 through a switch 203, in accordance with various embodiments. FIG. 3 illustrates an example process 300 performed by a port manager, e.g., the port manager 211, to manage a communication channel between a downstream port of a circuitry and an upstream port of a device through a switch, in accordance with various embodiments.

In embodiments, the apparatus 200 for communication includes the circuitry 201 coupled to a memory device 204 and a central processor unit (CPU) 202. The circuitry 201 is further coupled to the device 205 through the switch 203. The circuitry 201 may be a root complex. The device 205 may include a mouse, a disk, a keyboard, a memory device, or an input/output controller. All or some of the components, e.g., the circuitry 201, the memory device 204, the CPU) 202, the switch 203, and the device 205 may be assembled on a printed circuit board (PCB).

In embodiments, the circuitry 201 includes the downstream port 215, and may further include additional downstream ports, e.g., a downstream port 217. The circuitry 201 is further coupled to the switch 203 by a link 212 between the downstream port 215 and an upstream port 231 of the switch 203. The link 212 may be compatible to a first protocol. The switch 203 is coupled to the device 205 by a link 232 between a downstream port 233 of the switch 203 and the upstream port 251 of the device 205. The link 232 may be compatible to a second protocol. In addition, a device 206 is also coupled to the circuitry 201 by a link 219 between the downstream port 217 of the circuitry 201 and an upstream port 218 of the device 206. The link 219 may be compatible to the second protocol or the first protocol. Accordingly, the circuitry 201 may operate according to the second protocol at the downstream port 217, and may operate in a dual mode according to the first protocol or the second protocol at the downstream port 215.

In some embodiments, the first protocol may be CXL 2.0 protocol, and the second protocol may be CXL 1.1 protocol, a CXL 1.0 protocol, or a PCIe protocol. The link 212, the link 232, and the link 219 may be a PCI bus, a PCI-X, a PCI express bus, a CXL 1.0 bus, a CXL 1.1 bus, a CXL 2.0 bus, or some other computer bus.

In embodiments, the circuitry 201 further includes the port manager 211, a set of dedicated registers 213 in a MMIO address space of the circuitry 201, and a set of dedicated buses 216 for the link 212 between the downstream port 215 of the circuitry 201 and the upstream port 231 of the switch 203. The set of dedicated registers 213 may include a number of registers in circuitry register blocks (RCRB), or a number of memory base address register 0 (MEMBAR0). For example, the set of dedicated registers 213 includes a sequence of registers between a base register and a limit register.

In embodiments, the switch 203 includes a port manager 236, the upstream port 231, and the downstream port 233. The switch 203 further includes a first set of dedicated registers 235 and a first set of dedicated buses 236 of the upstream port 231 of the switch 203 for communication through the link 212. The switch 203 also includes a second set of dedicated registers 237 and a second set of dedicated buses 234 of the downstream port 233 for communication through the link 232.

In embodiments, a number of registers in the set of dedicated registers 213 in the circuitry 201 may be greater than or equal to a number of registers in the first set of dedicated registers 235 in the switch 203, and the number of registers in the first set of dedicated registers 235 in the switch 203 may be greater than or equal to a number of registers in the second set of dedicated registers 237 in the switch 203.

In embodiments, a number of buses in the set of dedicated buses 216 in the circuitry 201 may be greater than or equal to a number of buses in the first set of dedicated buses 236 of the upstream port 231 of the switch 203, and the number of buses in the first set of dedicated buses 236 of the upstream port 231 of the switch 203 may be greater than or equal to a number of buses in the second set of dedicated buses 234 of the downstream port 233 of the switch 203.

In embodiments, the port manager 211 of the circuitry 201 or the port manager 236 of the switch 203 may perform various operations. For example, the port manager 211 of the circuitry 201 may perform the process 300 shown in FIG. 3 to manage a communication channel between the downstream port 215 of the circuitry 201 and the upstream port 251 of the device 205 through the switch 203.

The process 300 may start at an interaction 301. During the interaction 301, operations may be performed by the port manager to detect a first link condition or a second link condition of the circuitry 201. Under the first link condition, a first link between the downstream port of the circuitry and an upstream port of a switch coupled with the circuitry is compatible to a first protocol, and a second link between a downstream port of the switch and an upstream port of a device coupled to the switch is compatible to the second protocol. Under the second link condition, the first link between the downstream port of the circuitry and the upstream port of the switch exists and is compatible to the first protocol. However, there is no second link being compatible to the second protocol between the downstream port of the switch and the upstream port of the device. For example, at the interaction 301, operations may be performed by the port manager 211 to detect a first link condition or a second link condition of the circuitry 201. Under the first link condition, the link 212 between the downstream port 215 of the circuitry 201 and the upstream port 231 of the switch 203 is compatible to the first protocol, and the link 232 between the downstream port 233 of the switch 203 and the upstream port 251 of the device 205 is compatible to the second protocol. Under the second link condition, the link 212 between the downstream port 215 of the circuitry 201 and the upstream port 231 of the switch 203 exists and is compatible to the first protocol. However, there is no link being compatible to the second protocol between the downstream port 233 of the switch 203 and an upstream port of a device. The second link condition is not shown in FIG. 2. There may be different situations when there is no link being compatible to the second protocol between the downstream port 233 of the switch 203 and an upstream port of a device. In some embodiments, there may not be any device attached to the downstream port 233 of the switch 203. In some other embodiments, there may be a link coupling a device to the downstream port 233 of the switch 203, however, the link may be compatible with the first protocol instead of the second protocol.

During the interaction 303, on detection of the first link condition, operations may be performed by the port manager to operate the downstream port of the circuitry according to the second protocol. For example, at the interaction 303, on detection of the first link condition, operations may be performed by the port manager 211 to operate the downstream port 215 of the circuitry 201 according to the second protocol, which is the protocol compatible with the link 232. Accordingly, the downstream port 215 may operate according to the first protocol compatible with the link 212 or the second protocol compatible with the link 232. On detection of the first link condition, the link 232 exists and is compatible with the second protocol, while the link 212 is compatible with the first protocol different from the second protocol.

During the interaction 304, on detection of the second link condition, operations may be performed by the port manager to operate the downstream port of the circuitry according to the first protocol. For example, at the interaction 304, on detection of the second link condition, operations may be performed by the port manager 211 to operate the downstream port 215 of the circuitry 201 according to the first protocol, which is the protocol compatible with the link 212. On detection of the second link condition, the link 232 may not exist, or exist but not compatible with the second protocol, while the link 212 is compatible with the first protocol different from the second protocol.

Figure 4A:
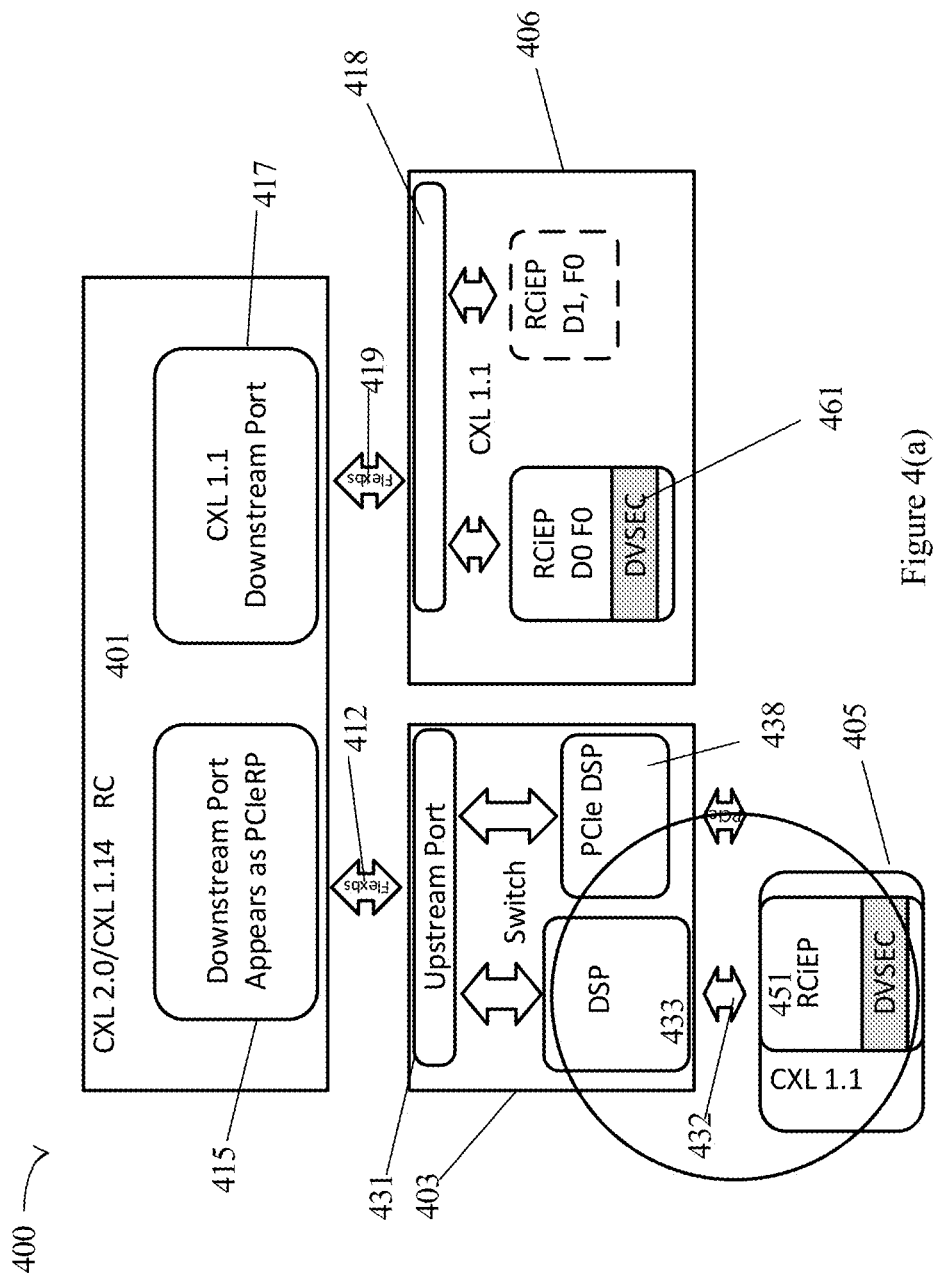
FIGS. 4(a)-4(c) illustrate various architectures for a device coupled to a root complex through a switch by compute express links (CXL), in accordance with various embodiments.
Figure 4B:
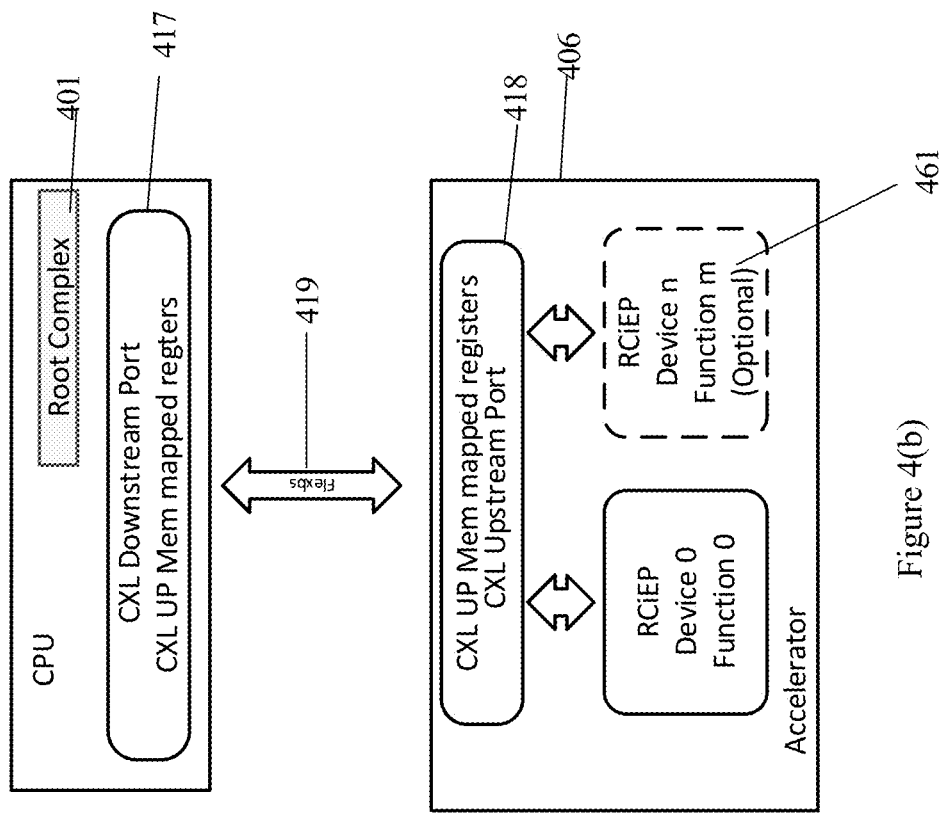
Figure 4C:
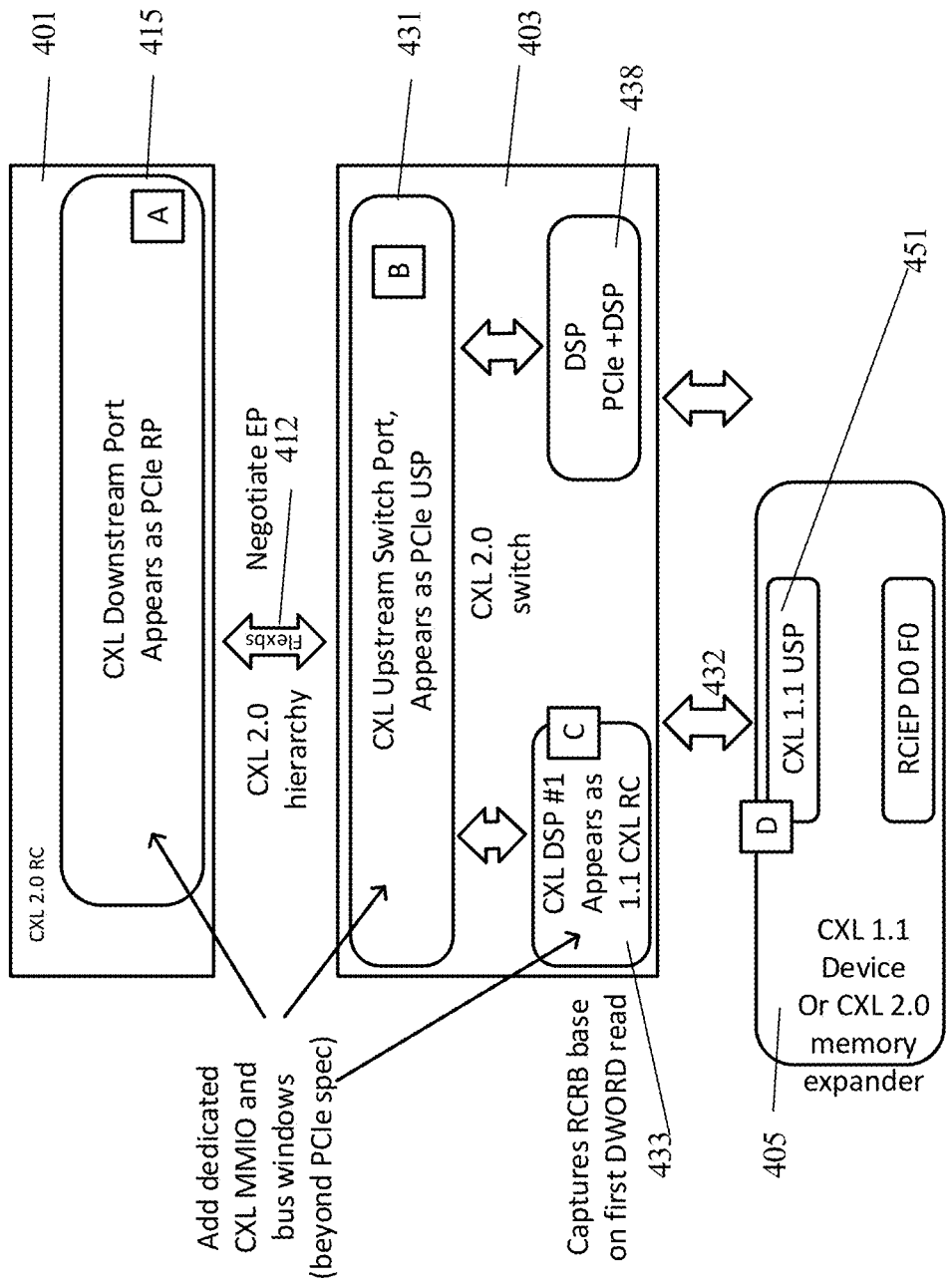

During the interaction 305, operations may be performed by the port manager to assign a first set of dedicated registers in the circuitry and a first set of dedicated buses to a communication channel between the downstream port of the circuitry and the upstream port of the device to facilitate exchange of the one or more messages between the circuitry and the device following the second protocol. The communication channel includes a first link between the downstream port of the circuitry and the upstream port of the switch, and a second link between the downstream port of the switch and the upstream port of the device. For example, at the interaction 305, operations may be performed by the port manager 211 to assign a first set of dedicated registers, e.g., the set of dedicated registers 213, in the circuitry 201 and a first set of dedicated buses, e.g., the set of dedicated buses 216, to a communication channel between the downstream port 215 of the circuitry 201 and the upstream port 251 of the device 205 to facilitate exchange of the one or more messages between the circuitry 201 and the device 205 following the second protocol. The communication channel includes a first link, e.g., the link 212, between the downstream port 215 of the circuitry 201 and the upstream port 231 of the switch 203, and a second link, e.g., the link 232, between the downstream port 233 of the switch 203 and the upstream port 251 of the device 205. The second protocol is the protocol compatible to the link 232 where the device 205 is attached to the switch 203. Hence, the communication between the circuitry 201 and the device 205 is to follow the protocol compatible to the link 232 where the device 205 is attached to the switch 203. On the other hand, the downstream port 215 of the circuitry 201 may be compatible to both the first protocol and the second protocol. In some embodiments, the circuitry 201 may be a root complex for CXL 2.0 protocol, the switch 203 may be a switch for CXL 2.0 protocol, and the device 205 may be a device for CXL 1.1 or 1.1 protocol. The first protocol is CXL 2.0 protocol, and the second protocol is CXL 1.1 protocol, a CXL 1.0 protocol, or a PCIe protocol. Accordingly, the port manager 211 enables a CXL 1.1 device or a CXL 1.0 device, e.g., the device 205, to be attached to a CXL 2.0 switch, e.g., the switch 203. More details of such examples are shown in FIGS. 4(a)-4(c).

During the interaction 307, operations may be performed by the port manager to exchange one or more messages between the circuitry and the device following the second protocol on a communication channel including the first link between the downstream port of the circuitry and the upstream port of the switch, and the second link between the downstream port of the switch and the upstream port of the device. For example, at the interaction 307, operations may be performed by the port manager 211 to exchange one or more messages between the circuitry 201 and the device 205 following the second protocol on a communication channel between the circuitry 201 and the device 205. The communication channel includes a first link, e.g., the link 212, between the downstream port 215 of the circuitry 201 and the upstream port 231 of the switch 203, and a second link, e.g., the link 232, between the downstream port 233 of the switch 203 and the upstream port 251 of the device 205.

During the interaction 309, operations may be performed by the port manager to manage the transmission of the one or more messages between the downstream port of the circuitry and the upstream port of the device following the second protocol, using a second set of dedicated registers in the switch and a second set of dedicated buses of the upstream port of the switch for communication through the first link, and a third set of dedicated registers in the switch and a third set of dedicated buses of the downstream port of the switch for communication through the second link. For example, at the interaction 309, operations may be performed by the port manager 211 to manage the transmission of the one or more messages between the downstream port 215 of the circuitry 201 and the upstream port 251 of the device 205 following the second protocol. The transmission of the one or more messages may be facilitated by dedicated registers and dedicated buses for each downstream port or upstream port of the communication path. In detail, the port manager 211 may be configured to use a second set of dedicated registers, e.g., the set of dedicated registers 235, in the switch 203 and a second set of dedicated buses, e.g., the set of dedicated buses 236, of the upstream port 231 of the switch 203 for communication through the link 212, and a third set of dedicated registers, e.g., the set of dedicated registers 237, in the switch 203 and a third set of dedicated buses, e.g., the set of dedicated buses 234, of the downstream port 233 of the switch 203 for communication through the link 232.

In embodiments, the use of the second set of dedicated registers in the switch and the second set of dedicated buses of the upstream port of the switch, and the third set of dedicated registers in the switch and the third set of dedicated buses of the downstream port of the switch may be managed by the port manager 236 of the switch 203, or coordinated between the port manager 236 of the switch 203 and the port manager 211 of the circuitry 201. For example, the port manager 236 of the switch 203 may also perform a process similar to the process 300 for the port manager 211. In detail, the port manager 236 of the switch 203 may detect a first link condition or a second link condition of the switch 203. Under the first link condition, a first link between the upstream port 231 of the switch 201 and the downstream port 215 of the circuitry 201 is compatible to the first protocol, and a second link between the downstream port 233 of the switch 203 and the upstream port 251 of the device 205 coupled to the switch 203 is compatible to the second protocol. Under the second link condition, the first link between the downstream port 215 of the circuitry 201 and the upstream port 231 of the switch 203 is compatible to the first protocol, without the second link between the downstream port 233 of the switch 203 and an upstream port of a device being compatible to the second protocol. On detection of the first link condition, the port manager 236 is to operate the upstream port 231 of the switch 203 and the downstream port 233 of the switch 203 according to the second protocol. On detection of the second link condition, the port manager 236 is to operate the upstream port 231 of the switch 203 according to the first protocol. Furthermore, the port manager 236 is to manage transmission of one or more messages between the downstream port 215 of the circuitry 201 and the upstream port 251 of the device 205 following the second protocol, using a first set of dedicated registers, e.g., the set of dedicated registers 235, in the switch 203 and a first set of dedicated buses, e.g., the set of dedicated buses 236, of the upstream port 231 of the switch 203 for communication through the first link, e.g., the link 212, and a second set of dedicated registers, e.g., the set of dedicated registers 237, in the switch 203 and a second set of dedicated buses, e.g., the set of dedicated buses 234, of the downstream port 233 of the switch 203 for communication through the second link, e.g., the link 232.

FIGS. 4(a)-4(c) illustrate various architectures for a device coupled to a root complex through a switch by compute express links (CXL), in accordance with various embodiments. FIG. 4(a) illustrates example CXL hierarchy, in accordance with various embodiments. The CXL hierarchy illustrated in FIG. 4(a) may be an example of the apparatus 200 for communication shown in FIG. 2, and including devices coupled by a computer bus applicable to the computer bus 105 shown in FIG. 1 when the computer bus 105 is a CXL interconnect. FIG. 4(b) illustrates an example CXL software (SW) model for a CXL device directly attached to the root complex. FIG. 4(c) illustrates an example address decode isolation to facilitate the communication between a downstream port of the root complex and an upstream port of a device through a switch, in accordance with various embodiments.

FIG. 4(a) illustrates a sample CXL 2.0 hierarchy, which is an apparatus 400. The apparatus 400 includes a root complex 401 coupled to a device 405 through a switch 403. The root complex 401 is further coupled to a device 406. The apparatus 400, the root complex 401, the switch 403, the device 405, and the device 406 are examples of the apparatus 200, the circuitry 201, the switch 203, the device 205, and the device 206, as shown in FIG. 2.

In embodiments, the root complex 401 includes a downstream port 415, and a downstream port 417. The root complex 401 is further coupled to the switch 403 by a link 412 between the downstream port 415 and an upstream port 431 of the switch 403. The link 412 may be compatible to a first protocol. The switch 403 is coupled to the device 405 by a link 432 between a downstream port 433 of the switch 403 and the upstream port 451 of the device 405. The switch 403 may further include a downstream port 438 to be coupled to another device, not shown. The link 432 may be compatible to a second protocol. In addition, the device 406 is also coupled to the root complex 401 by a link 419 between the downstream port 417 of the root complex 401 and an upstream port 418 of the device 406. The link 419 may be compatible to the second protocol. The device 406 may include various function, e.g., a function 461. Accordingly, the root complex 401 may operate according to the second protocol at the downstream port 417, and may operate in a dual mode according to the first protocol or the second protocol at the downstream port 415. In some embodiments, the first protocol may be CXL 2.0 protocol, and the second protocol may be CXL 1.1 protocol, a CXL 1.0 protocol, or a PCIe protocol. The link 212, the link 232, and the link 219 may be a PCI bus, a PCI-X, a PCI express bus, a CXL 1.0 bus, a CXL 1.1 bus, a CXL 2.0 bus, or some other computer bus.

In embodiments, the root complex 401 and the switch 403 may be CXL 2.0 compatible and expected to be bi-modal and detect, during training, whether it is connected to a CXL 1.1 device, e.g., the device 205, or a CXL 2.0 device. They comes up in Endpoint (EP) mode if the device 405 is a CXL 2.0 device. They come up in RC/RCiEP mode if the device 405 is a CXL 1.1 device.

Embodiments herein present techniques described above, e.g., the description for FIG. 2 and FIG. 3, on making a CXL 1.1 device work when attached to CXL 2.0 switch (the components inside the circle). This scheme can scale to more complex configurations such as nested switches or multiple CXL 1.1 devices below a switch. One aspect of the technique presented herein is address decode isolation, as described in FIG. 4(c).

In detail, FIG. 4(b) illustrates the CXL downstream port 417, the CXL upstream port 418 and the link 419 which are not visible to the legacy PCIe enumeration software and are mapped in MMIO space. The CXL SW model shown in FIG. 4(b) may be for CXL 1.1 devices, e.g., the device 406.

CXL 1.1 devices, e.g., the device 406, may appear as RCiEP. However, the current PCIe architecture does not allow RCiEPs below a switch. Embodiments herein may define a mechanism that allows CXL 1.1 devices to be attached below a CXL 2.0 switch without requiring a rewrite of PCIe enumeration software. Embodiments herein may enable CXL 1.1 devices to work correctly in a CXL 2.0 system no matter which slot they are placed in—either attached to the CPU or behind a CXL 2.0 switch.

FIG. 4(c) illustrates an example address decode isolation to facilitate the communication between a downstream port of the root complex and an upstream port of a device through a switch. This involves addition of MMIO registers and bus decode ranges to root complex, upstream switch port and downstream switch port. These ranges are called CXL MMIO/bus windows. They behave similar to the standard PCIe MMIO/bus window registers in Type 1 header, but are in addition to the PCIe ones. The MMIO registers may include the following:

| Register | Definition |
| --- | --- |
| CXL.IO Memory Base, CXL.IO Memory Limit | Equivalent to and in addition to the Prefetchable Memory Base/Memory Limit registers in Type 1 Configuration space header. 64 bit decoders. |
| CXL.IO Secondary Bus Number CXL.IO Subordinate Bus Number | Equivalent to and in addition to the Secondary Bus Number and Subordinate Bus Number registers in Type 1 Configuration space header. |
| CXL.IO Memory space enable | Controls whether the CXL.IO Memory decode is active, isolates the downstream decode path from PCIe root port/switch port Memory Space enable bits |
| CLX.IO Bus Master Enable | Controls whether the upstream transactions with bus number in the range {CXL.IO secondary, CXL.IO Subordinate) are forwarded, isolates the downstream decode path from PCIe root port/switch port Bus master enable bits |
| Lock | System Firmware may lock the CXL.IO decoders to prevent OSPM from modifying those |

As shown in FIG. 4(c), various sets of dedicated registers and dedicated buses are added into the root complex or the switch to achieve address decode isolation. Address decode isolation creates the illusion that the CXL 1.1 device is not a child of the CXL 2.0 root complex, but rather a CXL 1.1 RCiEP that is peer to the root complex. PCIe SW is not aware of CXL MMIO/Bus window and cannot modify it. The downstream port 415 is marked as component A, the upstream port 431 is marked as component B, the downstream port 433 is marked as component C, and the upstream port 451 is marked as component D.

In CXL 1.1 world, the upstream and downstream port each contain memory mapped 4 K RCRB range and 64K MEMORY BASE ADDRESS REGISTER 0 range. CXL Downstream port, when operating in 1.1 mode, captures the RCRB base from the address of the first read it observes. This behavior is retained and no changes to CXL 1.1 device are needed.

Here is an example of address decode isolation at work, CXL MMIO Windows in A=2 GB to 2.125 GB
a. C gets 2 GB to 2.125 GB range
b. C RCRB base=2 GB
c. D RCRB base=2 GB+4K
d. C MEMBAR0 base=2 GB+64K
e. D MEMBAR0 base=2 GB+128K
CXL Bus Windows in A={24,24}

C registers are not visible in configuration space, only accessible via RCRB like a CXL 1.1 RC UEFI reports C as a new host bridge and CXL device as RCiEP under it at base bus number (BBN)=24.

Initialization Flow
A. During training
1. A detects a CXL 2.0 switch and comes up in 2.0 mode
2. B detects a bi-model RC and comes up in 2.0 mode
3. C detects CXL 1.1 device and comes up in 1.1 RC mode
4. D comes up in RCiEP mode since it is a CXL 1.1 device and that is the only mode it supports
B. SW programming
1. Detect if there is a CXL 1.1 RC in hierarchy. In this case, SW will discover one below B. SW will then proceed with rest of the initialization steps.
2. A: configure CXL MMIO Base=BASE, CXL Secondary Bus=N
3. A: configure CXL MMIO Limit=LIMIT, CXL Subordinate Bus=N
4. B: configure CXL MMIO Base=BASE, CXL Secondary Bus=N
5. B: configure CXL MMIO Limit=LIMIT, CXL Subordinate Bus=N
6. C: configure CXL MMIO Base=BASE, CXL Secondary Base=N
7. C: configure CXL MMIO Limit=LIMIT, CXL Subordinate Bus=N. Programming steps 2-7 configure the registers that are introduced herein. These ensure that the MMIO range {BASE, LIMIT} is forwarded to D via C.
8. Issue 4B read to BASE. C captures it as RCRB base. This action and other actions together help to facilitate the techniques presented herein.
9. Issue 4B read to BASE+4K. D captures it as RCRB base. This is how CXL 1.1 upstream port behaves today.
10. Program MEMBAR0 in C, D. Similar to CXL 1.1 flow.
11. Configure the link between C, D. Similar to CXL 1.1 flow.
12. Issue a configuration write to bus N, device 0, function 0. CXL 1.1 device will capture the bus number based on this write. Same as CXL 1.1 behavior.
13. Enumerate D like a CXL 1.1 device Legacy PCIe enumeration software may rely on presence of device number 0, function number 0 on the PCIe bus number internal to the switch. If the downstream port that operates in CXL 1.1 mode was originally located at Device #0, Function #0, the switch may need to take additional steps to ensure compatibility with legacy software. These steps could include renumbering device/function numbers, placing a dummy downstream port at Device #0, function #0 etc.

Figure 5:
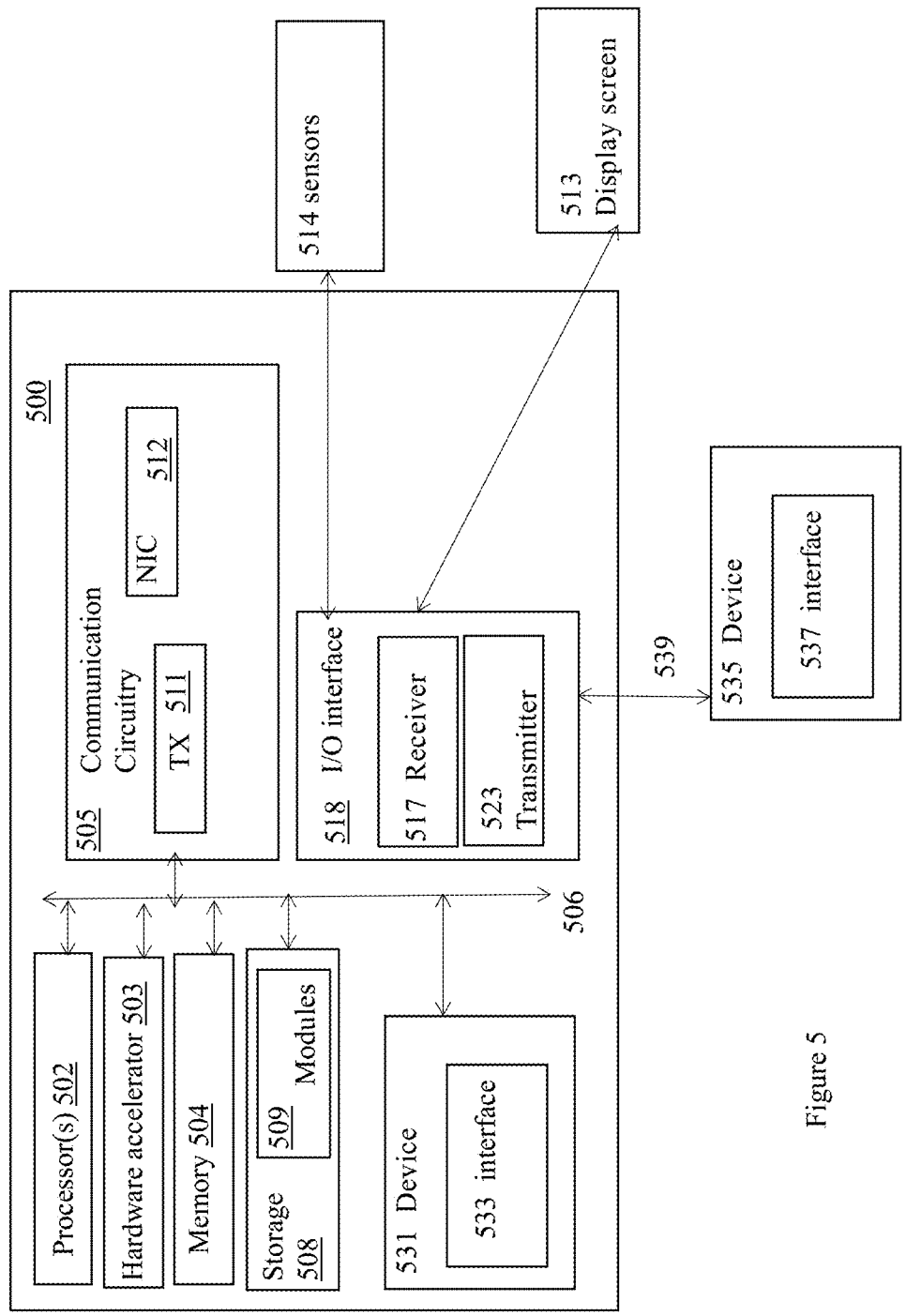
FIG. 5 illustrates an example device suitable for use to practice various aspects of the present disclosure, in accordance with various embodiments.

FIG. 5 illustrates an example device suitable for use to practice various aspects of the present disclosure, in accordance with various embodiments. The device 500 may be used to implement functions of the apparatus 100, the apparatus 200, the process 300, or the apparatus 400. As shown, the device 500 may include one or more processors 502, each having one or more processor cores, or and optionally, a hardware accelerator 503 (which may be an ASIC or a FPGA). In alternate embodiments, the hardware accelerator 503 may be part of processor 502, or integrated together on a SOC. Additionally, the device 500 may include a memory 504, which may be any one of a number of known persistent storage medium, and a data storage circuitry 508 including modules 509. In addition, the 500 may include an I/O interface 518, coupled to one or more sensors 514, and a display screen 513.

The I/O interface 518 may include a transmitter 523 and a receiver 517.

Furthermore, the device 500 may include communication circuitry 505 including a transceiver (Tx) 511, and network interface controller (NIC) 512. The elements may be coupled to each other via system bus 506, which may represent one or more buses. In the case of multiple buses, they may be bridged by one or more bus bridges (not shown). A device 531 may be coupled to the system bus 506, and a device 535 may be coupled to a computer bus 539. The device 531 may include an interface 533, and the device 535 may include an interface 537. In embodiments, the computer bus 506 or the computer bus 539 may be an example of the computer bus 105 as shown in FIG. 1.

In embodiments, the processor(s) 502 (also referred to as "processor circuitry 502") may be one or more processing elements configured to perform basic arithmetical, logical, and input/output operations by carrying out instructions. Processor circuitry 502 may be implemented as a standalone system/device/package or as part of an existing system/device/package. The processor circuitry 502 may be one or more microprocessors, one or more single-core processors, one or more multi-core processors, one or more multi-threaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 502 may be a part of a SoC in which the processor circuitry 502 and other components discussed herein are formed into a single IC or a single package. As examples, the processor circuitry 502 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the processor circuitry 502 may include a sensor hub, which may act as a coprocessor by processing data obtained from the one or more sensors 514. The sensor hub may include circuitry configured to integrate data obtained from each of the one or more sensors 514 by performing arithmetical, logical, and input/output operations. In embodiments, the sensor hub may capable of timestamping obtained sensor data, providing sensor data to the processor circuitry 502 in response to a query for such data, buffering sensor data, continuously streaming sensor data to the processor circuitry 502 including independent streams for each sensor of the one or more sensors 514, reporting sensor data based upon predefined thresholds or conditions/triggers, and/or other like data processing functions.

In embodiments, the memory 504 (also referred to as "memory circuitry 504" or the like) may be circuitry configured to store data or logic for operating the computer device 500. The memory circuitry 504 may include number of memory devices may be used to provide for a given amount of system memory. As examples, the memory circuitry 504 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, antifuses, etc.) that may be configured in any suitable implementation as are known. In various implementations, individual memory devices may be formed of any number of different package types, such as single die package (SDP), dual die package (DDP) or quad die package, dual inline memory modules (DIMMs) such as microDIMMs or Mini-DIMMs, and/or any other like memory devices. To provide for persistent storage of information such as data, applications, operating systems and so forth, the memory circuitry 504 may include one or more mass-storage devices, such as a solid state disk drive (SSDD); flash memory cards, such as SD cards, microSD cards, xD picture cards, and the like, and USB flash drives; on-die memory or registers associated with the processor circuitry 502 (for example, in low power implementations); a micro hard disk drive (HDD); three dimensional cross-point (3D XPOINT) memories from Intel® and Micron®, etc.

Where FPDs are used, the processor circuitry 502 and memory circuitry 504 (and/or data storage circuitry 508) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 502 to implement various logic functions. The memory cells may include any combination of various levels of memory/storage including, but not limited to, EPROM, EEPROM, flash memory, SRAM, antifuses, etc.

In embodiments, the data storage circuitry 508 (also referred to as "storage circuitry 508" or the like), with shared or respective controllers, may provide for persistent storage of information such as modules 509, operating systems, etc. The data storage circuitry 508 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 502; hard disk drives (HDDs); micro HDDs; resistance change memories; phase change memories; holographic memories; or chemical memories; among others. As shown, the data storage circuitry 508 is included in the computer device 500; however, in other embodiments, the data storage circuitry 508 may be implemented as one or more devices separated from the other elements of computer device 500.

In some embodiments, the data storage circuitry 508 may include an operating system (OS) (not shown), which may be a general purpose operating system or an operating system specifically written for and tailored to the computer device 500. The OS may include one or more drivers, libraries, and/or application programming interfaces (APIs), which may provide program code and/or software components for modules 509 and/or control system configurations to control and/or obtain/process data from the one or more sensors 514.

The modules 509 may be software modules/components used to perform various functions of the computer device 500 and/or to carry out functions of the example embodiments discussed herein. In embodiments where the processor circuitry 502 and memory circuitry 504 includes hardware accelerators (e.g., FPGA cells, the hardware accelerator 503) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 509 may comprise logic for the corresponding entities discussed with regard to the display screen 513, the transmitter 523, and the receiver 517.

The components of computer device 500 may communicate with one another over the bus 506. The bus 506 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 506 may be a controller area network (CAN) bus system, a Time-Trigger Protocol (TTP) system, or a FlexRay system, which may allow various devices (e.g., the one or more sensors 514, etc.) to communicate with one another using messages or frames.

The communications circuitry 505 may include circuitry for communicating with a wireless network or wired network. For example, the communication circuitry 505 may include transceiver (Tx) 511 and network interface controller (NIC) 512. Communications circuitry 505 may include one or more processors (e.g., baseband processors, modems, etc.) that are dedicated to a particular wireless communication protocol.

NIC 512 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 512 may be included to allow connect to a second network (not shown) or other devices, for example, a first NIC 512 providing communications to the network over Ethernet, and a second NIC 512 providing communications to other devices over another type of network, such as a personal area network (PAN) including a personal computer (PC) device. In some embodiments, the various components of the device 500, such as the one or more sensors 514, etc. may be connected to the processor(s) 502 via the NIC 512 as discussed above rather than via the I/O circuitry 518 as discussed infra.

The Tx 511 may include one or more radios to wirelessly communicate with a network and/or other devices. The Tx 511 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 500. In some embodiments, the various components of the device 500, such as the one or more sensors 514, etc. may be connected to the device 500 via the Tx 511 as discussed above rather than via the I/O circuitry 518 as discussed infra. In one example, the one or more sensors 514 may be coupled with device 500 via a short range communication protocol.

The Tx 511 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 518 may include circuitry, such as an external expansion bus (e.g., Universal Serial Bus (USB), FireWire, Thunderbolt, PCI/PCIe/PCIx, etc.), used to connect computer device 500 with external components/devices, such as one or more sensors 514, etc. I/O interface circuitry 518 may include any suitable interface controllers and connectors to interconnect one or more of the processor circuitry 502, memory circuitry 504, data storage circuitry 508, communication circuitry 505, and the other components of computer device 500. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 506), ports, slots, jumpers, interconnect modules, receptacles, modular connectors, etc. The I/O circuitry 518 may couple the device 500 with the one or more sensors 514, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 514 may be any device configured to detect events or environmental changes, convert the detected events into electrical signals and/or digital data, and transmit/send the signals/data to the computer device 500. Some of the one or more sensors 514 may be sensors used for providing computer-generated sensory inputs. Some of the one or more sensors 514 may be sensors used for motion and/or object detection. Examples of such one or more sensors 514 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 514 may include a lens-less image capture mechanism comprising an array of aperture elements, wherein light passing through the array of aperture elements define the pixels of an image. In embodiments, the motion detection one or more sensors 514 may be coupled with or associated with light generating devices, for example, one or more infrared projectors to project a grid of infrared light onto a scene, where an infrared camera may record reflected infrared light to compute depth information.

Some of the one or more sensors 514 may be used for position and/or orientation detection, ambient/environmental condition detection, and the like. Examples of such one or more sensors 514 may include, inter alia, microelectromechanical systems (MEMS) with piezoelectric, piezoresistive and/or capacitive components, which may be used to determine environmental conditions or location information related to the computer device 500. In embodiments, the MEMS may include 3-axis accelerometers, 3-axis gyroscopes, and/or magnetometers. In some embodiments, the one or more sensors 514 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 502, the hardware accelerator 503, the memory 504, the data storage circuitry 508 including the modules 509, the input/output interface 518, the one or more sensors 514, the communication circuitry 505 including the Tx 511, the NIC 512, the system bus 506, the computer bus 539, the device 531, the device 535, may perform its conventional functions known in the art. In addition, they may be employed to store and host execution of programming instructions implementing the operations associated with managing a communication channel between a downstream port of a circuitry and an upstream port of a device through a switch, as described in connection with FIGS. 1-4, and/or other functions that provides the capability of the embodiments described in the current disclosure. The various elements may be implemented by assembler instructions supported by processor(s) 502 or high-level languages, such as, for example, C, that can be compiled into such instructions. Operations associated with the device 500 not implemented in software may be implemented in hardware, e.g., via hardware accelerator 503.

The number, capability and/or capacity of these elements 502-539 may vary, depending on the number of other devices the device 500 is configured to support. Otherwise, the constitutions of elements 502-539 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 6:
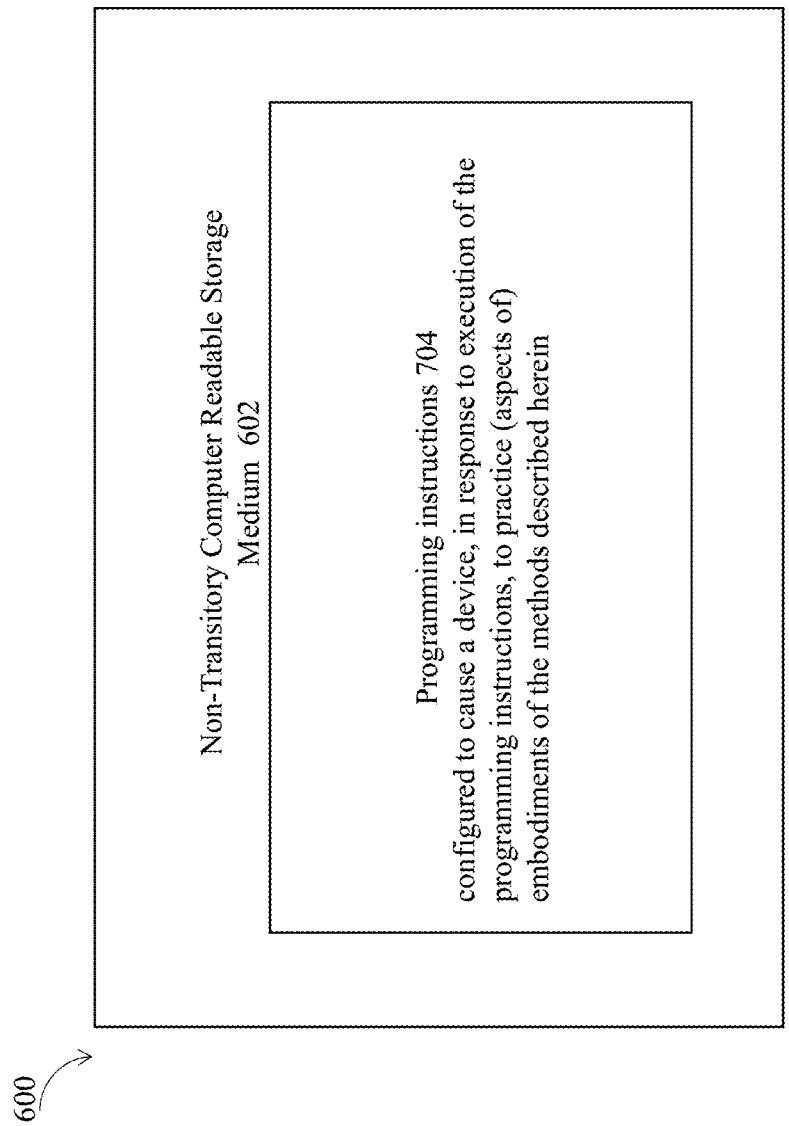
FIG. 6 illustrates a storage medium having instructions for practicing methods described with references to FIGS. 1-5, in accordance with various embodiments.

Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., device 600, in response to execution of the programming instructions, to perform, e.g., various operations associated with managing a communication channel between a downstream port of a circuitry and an upstream port of a device through a switch, as shown in FIGS. 1-5.

In alternate embodiments, programming instructions 604 may be disposed on multiple computer-readable non-transitory storage media 602 instead. In alternate embodiments, programming instructions 604 may be disposed on computer-readable transitory storage media 602, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Examples

Example 1 may include an apparatus for communication, comprising: circuitry including a port manager and a downstream port, wherein the port manager is to detect a first link condition or a second link condition, where under the first link condition, a first link between the downstream port of the circuitry and an upstream port of a switch coupled with the circuitry is compatible to a first protocol, and a second link between a downstream port of the switch and an upstream port of a device coupled to the switch is compatible to the second protocol, and under the second link condition, the first link between the downstream port of the circuitry and the upstream port of the switch is compatible to the first protocol, without the second link between the downstream port of the switch and the upstream port of the device being compatible to the second protocol; and wherein on detection of the first link condition, the port manager is to operate the downstream port of the circuitry according to the second protocol, and on detection of the second link condition, the port manager is to operate the downstream port of the circuitry according to the first protocol.

Example 2 may include the apparatus of example 1 and/or some other examples herein, wherein on detection of the first link condition, one or more messages are exchanged between the circuitry and the device following the second protocol on a communication channel including the first link between the downstream port of the circuitry and the upstream port of the switch, and the second link between the downstream port of the switch and the upstream port of the device, and wherein the downstream port of the circuitry has a first set of dedicated registers in a memory mapped input-output address space of the circuitry and a first set of dedicated buses for the first link between the downstream port of the circuitry and the upstream port of the switch; wherein on detection of the first link condition, the port manager is configured to assign the first set of dedicated registers in the circuitry and the first set of dedicated buses to a communication channel between the downstream port of the circuitry and the upstream port of the device, having the first link between the downstream port of the circuitry and the upstream port of the switch, and the second link between the downstream port of the switch and the upstream port of the device, to facilitate exchange of the one or more messages between the circuitry and the device following the second protocol.

Example 3 may include the apparatus of example 2 and/or some other examples herein, wherein the port manager is further configured to: manage the transmission of the one or more messages between the downstream port of the circuitry and the upstream port of the device following the second protocol, using a second set of dedicated registers in the switch and a second set of dedicated buses of the upstream port of the switch for communication through the first link, and a third set of dedicated registers in the switch and a third set of dedicated buses of the downstream port of the switch for communication through the second link.

Example 4 may include the apparatus of example 3 and/or some other examples herein, wherein a first number of registers in the first set of dedicated registers in the circuitry is greater than or equal to a second number of registers in the second set of dedicated registers in the switch, and the second number of registers in the second set of dedicated registers in the switch is greater than or equal to a third number of registers in the third set of dedicated registers in the switch.

Example 5 may include the apparatus of example 3 and/or some other examples herein, wherein a first number of buses in the first set of dedicated buses is greater than or equal to a second number of buses in the second set of dedicated buses, and the second number of buses in the second set of dedicated buses is greater than or equal to a third number of buses in the third set of dedicated buses.

Example 6 may include the apparatus of example 1 and/or some other examples herein, further comprising: a processor or a central processor unit (CPU) coupled to the circuitry; and a memory device coupled to the circuitry.

Example 7 may include the apparatus of example 1 and/or some other examples herein, further comprising: the switch; and the device.

Example 8 may include the apparatus of example 1 and/or some other examples herein, wherein the device is a first device, and the circuitry further includes a second downstream port of a second protocol configured to be coupled to an upstream port of a second device according to the second protocol.

Example 9 may include the apparatus of example 1 and/or some other examples herein, wherein the first set of dedicated registers includes a number of registers in circuitry register blocks (RCRB), or a number of memory base address register 0.

Example 10 may include the apparatus of example 1 and/or some other examples herein, wherein the first set of dedicated registers includes a sequence of registers between a base register and a limit register.

Example 11 may include the apparatus of example 1 and/or some other examples herein, wherein the first protocol is CXL 2.0 protocol, and the second protocol is CXL 1.1 protocol, a CXL 1.0 protocol, or a PCIe protocol; and wherein the device includes a mouse, a disk, a keyboard, a memory device, or an input/output controller.

Example 12 may include an apparatus for communication, comprising: a switch including a port manager, an upstream port, and a downstream port; wherein the port manager is to detect a first link condition or a second link condition, where under the first link condition, a first link between the upstream port of the switch and a downstream port of a circuitry coupled to the switch is compatible to a first protocol, and a second link between the downstream port of the switch and an upstream port of a device coupled to the switch is compatible to a second protocol, and under the second link condition, the first link between the downstream port of the circuitry and the upstream port of the switch is compatible to the first protocol, without the second link between the downstream port of the switch and the upstream port of the device being compatible to the second protocol; and wherein on detection of the first link condition, the port manager is to operate the upstream port of the switch and the downstream port of the switch according to the second protocol, and on detection of the second link condition, the port manager is to operate the upstream port of the switch according to the first protocol.

Example 13 may include the apparatus of example 12 and/or some other examples herein, wherein the port manager is to manage transmission of one or more messages between the downstream port of the circuitry and the upstream port of the device following the second protocol, using a first set of dedicated registers in the switch and a first set of dedicated buses of the upstream port of the switch for communication through the first link, and a second set of dedicated registers in the switch and a second set of dedicated buses of the downstream port of the switch for communication through the second link.

Example 14 may include the apparatus of example 13 and/or some other examples herein, wherein on detection of the first link condition, one or more messages are exchanged between the circuitry and the device following the second protocol on a communication channel including the first link between the downstream port of the circuitry and the upstream port of the switch, and the second link between the downstream port of the switch and the upstream port of the device, and wherein the downstream port of the circuitry has a third set of dedicated registers in a memory mapped input-output (MMIO) address space of the circuitry and a third set of dedicated buses for the first link between the downstream port of the circuitry and the upstream port of the switch; wherein on detection of the first link condition, the port manager is to manage the transmission of one or more messages through the first link between the downstream port of the circuitry and the upstream port of the switch using the third set of dedicated registers in the memory mapped input-output (MMIO) address space of the circuitry and the third set of dedicated buses for the first link.

Example 15 may include the apparatus of example 14 and/or some other examples herein, wherein a first number of registers in the first set of dedicated registers in the switch is greater than or equal to a second number of registers in the second set of dedicated registers in the switch, and the third number of registers in the third set of dedicated registers in the MMIO address space of the circuitry is greater than or equal to a third number of registers in the first set of dedicated registers in the switch.

Example 16 may include the apparatus of example 14 and/or some other examples herein, wherein a first number of buses in the first set of dedicated buses is greater than or equal to a second number of buses in the second set of dedicated buses, and a third number of buses in the third set of dedicated buses is greater than or equal to a first number of buses in the first set of dedicated buses.

Example 17 may include the apparatus of example 13 and/or some other examples herein, wherein the first set of dedicated registers includes a number of registers in circuitry register blocks (RCRB), or a number of memory base address register 0 (MEMBAR0).

Example 18 may include the apparatus of example 13 and/or some other examples herein, wherein the first set of dedicated registers includes a sequence of registers between a base register and a limit register.

Example 19 may include the apparatus of example 12 and/or some other examples herein, wherein the first protocol is CXL 2.0 protocol, and the second protocol is CXL 1.1 protocol, a CXL 1.0 protocol, or a PCIe protocol.

Example 20 may include the apparatus of example 12 and/or some other examples herein, wherein the device includes a mouse, a disk, a keyboard, a memory device, or an input/output controller.

Example 21 may include an apparatus for computing, comprising: a printed circuit board (PCB) having a first link and a second link selected from a peripheral component interconnect (PCI) bus, a PCI Extended bus (PCI-X), a PCI express bus, a CXL 1.0 bus, a CXL 1.1 bus, or a CXL 2.0 bus; a root complex including a port manager and a downstream port, and a switch coupled to the root complex and including an upstream port, and a downstream port; wherein the port manager of the root complex is to detect a first link condition or a second link condition, where under the first link condition, a first link between the downstream port of the root complex and the upstream port of the switch is compatible to a first protocol, and a second link between the downstream port of the switch and an upstream port of a device is compatible to a second protocol, and under the second link condition, the first link between the downstream port of the root complex and the upstream port of the switch is compatible to the first protocol, without the second link between the downstream port of the switch and the upstream port of the device being compatible to the second protocol; and wherein on detection of the first link condition, the port manager is to operate the downstream port of the root complex according to the second protocol, and on detection of the second link condition, the port manager is to operate the downstream port of the root complex according to the first protocol.

Example 22 may include the apparatus of example 21 and/or some other examples herein, further comprising: a processor or a central processor unit (CPU) coupled to the circuitry; and a memory device coupled to the circuitry.

Example 23 may include the apparatus of example 21 and/or some other examples herein, wherein on detection of the first link condition, one or more messages are exchanged between the root complex and the device following the second protocol on a communication channel including the first link between the downstream port of the circuitry and the upstream port of the switch, and the second link between the downstream port of the switch and the upstream port of the device, and wherein the downstream port of the circuitry has a first set of dedicated registers in a memory mapped input-output address space of the circuitry and a first set of dedicated buses for the first link between the downstream port of the circuitry and the upstream port of the switch; wherein on detection of the first link condition, the port manager is configured to assign the first set of dedicated registers in the circuitry and the first set of dedicated buses to a communication channel between the downstream port of the circuitry and the upstream port of the device, having the first link between the downstream port of the circuitry and the upstream port of the switch, and the second link between the downstream port of the switch and the upstream port of the device, to facilitate exchange of messages between the root complex and the device following the second protocol.

Example 24 may include the apparatus of example 21 and/or some other examples herein, wherein the port manager is further configured to: manage the transmission of the one or more messages between the downstream port of the circuitry and the upstream port of the device following the second protocol, using a second set of dedicated registers in the switch and a second set of dedicated buses of the upstream port of the switch for communication through the first link, and a third set of dedicated registers in the switch and a third set of dedicated buses of the downstream port of the switch for communication through the second link.

Example 25 may include the apparatus of example 21 and/or some other examples herein, wherein the first protocol is CXL 2.0 protocol, and the second protocol is CXL 1.1 protocol, a CXL 1.0 protocol, or a PCIe protocol; and wherein the device includes a mouse, a disk, a keyboard, a memory device, or an input/output controller.

Example 26 may include an apparatus comprising: means for managing interoperability of switches in computer buses.

Example 27 may include the apparatus of example 1 and/or some other examples herein, wherein the computer buses include CXL interconnect.

Example 28 may include an apparatus comprising means to perform one or more elements of a method described in or related to any of examples herein, or any other method or process described herein.

Example 29 may include one or more non-transitory computer-readable media comprising instructions to cause an electronic device, upon execution of the instructions by one or more processors of the electronic device, to perform one or more elements of a method described in or related to any of examples herein, or any other method or process described herein.

Example 30 may include an apparatus comprising logic, modules, or circuitry to perform one or more elements of a method described in or related to any of examples herein, or any other method or process described herein.

Example 31 may include a method, technique, or process as described in or related to any of examples herein, or portions or parts thereof.

Example 32 may include an apparatus comprising: one or more processors and one or more computer readable media comprising instructions that, when executed by the one or more processors, cause the one or more processors to perform the method, techniques, or process as described in or related to any of examples herein, or portions thereof.

Example 33 may include a signal as described in or related to any of examples herein, or portions or parts thereof.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus for a first device to communicate with a switch, separate and distinct from the first device, comprising:

root complex circuitry disposed at the first device, the root complex circuitry including a port manager and a downstream port operable in accordance with either a first or a second protocol, the first protocol having more functionalities than the second protocol, wherein the port manager is to detect whether the root complex circuitry is under a first link condition or a second link condition, wherein to detect whether the circuitry is under the first link condition, the port manager is to detect whether the first device is coupled to a switch that is in turn coupled to a second device, separate and distinct from the first device and the switch, wherein a first link between the downstream port of the root complex circuitry and an upstream port of the switch is compatible with the first protocol, and a second link between a downstream port of the switch and an upstream port of the second device is compatible to the second protocol, and wherein to detect whether the circuitry is under the second link condition, the port manager is to detect whether the first device is coupled to the switch without the second device being coupled to the switch, the first link between the downstream port of the circuitry and the upstream port of the switch is compatible with the first protocol, without the second link between the downstream port of the switch and the upstream port of the second device being compatible to the second protocol; and wherein on detection of the first link condition, the port manager is to operate the downstream port of the root complex circuitry according to the second protocol, and on detection of the second link condition, the port manager is to operate the downstream port of the circuitry according to the first protocol, wherein the downstream port of the root complex circuitry has a first set of dedicated registers in a memory mapped input-output address space of the root complex circuitry, and a first set of dedicated buses for the first link between the downstream port of the root complex circuitry and the upstream port of the switch, wherein the port manager is to assign, on detection of the first link condition, the first set of dedicated registers disposed in the root complex circuitry and the first set of dedicated buses disposed in the root complex circuitry to a communication channel between the downstream port of the root complex circuitry and the upstream port of the second device via the switch that couples the first and second devices, having the first link between the downstream port of the circuitry and the upstream port of the switch, and the second link between the downstream port of the switch and the upstream port of the second device, to facilitate exchange of one or more messages between the root complex circuitry and the second device following the second protocol.

2. The apparatus of claim 1, wherein the root complex circuitry is further configured to facilitate, on detection of the first link condition, exchange of the one or more messages exchanged between the root complex circuitry and the second device following the second protocol on the communication channel including the first link between the downstream port of the root complex circuitry and the upstream port of the switch, and the second link between the downstream port of the switch and the upstream port of the second device.

3. The apparatus of claim 1, wherein the port manager is further configured to:
manage the transmission of the one or more messages between the downstream port of the root complex circuitry and the upstream port of the second device following the second protocol, using a second set of dedicated registers in the switch and a second set of dedicated buses of the upstream port of the switch for communication through the first link, and a third set of dedicated registers in the switch and a third set of dedicated buses of the downstream port of the switch for communication through the second link.

4. The apparatus of claim 3, wherein a first number of registers in the first set of dedicated registers in the root complex circuitry is greater than or equal to a second number of registers in the second set of dedicated registers in the switch, and the second number of registers in the second set of dedicated registers in the switch is greater than or equal to a third number of registers in the third set of dedicated registers in the switch.

5. The apparatus of claim 3, wherein a first number of buses in the first set of dedicated buses is greater than or equal to a second number of buses in the second set of dedicated buses, and the second number of buses in the second set of dedicated buses is greater than or equal to a third number of buses in the third set of dedicated buses.

6. The apparatus of claim 1, further comprising:
a processor or a central processor unit (CPU) coupled to the root complex circuitry; and
a memory device coupled to the root complex circuitry.

7. The apparatus of claim 1, wherein the root complex circuitry further includes a second downstream port of a second protocol configured to be coupled to an upstream port of a third device according to the second protocol.

8. The apparatus of claim 1, wherein the first set of dedicated registers includes a number of registers in circuitry register blocks (RCRB), or a number of memory base address register 0.

9. The apparatus of claim 1, wherein the first set of dedicated registers includes a sequence of registers between a base register and a limit register.

10. The apparatus of claim 1, wherein the first protocol is Compute Express Link (CXL) 2.0 protocol, and the second protocol is either CXL 1.1 protocol, CXL 1.0 protocol, or Peripheral Component Interconnect Express (PCIe) protocol; and
wherein the second device includes a mouse, a disk, a keyboard, a memory device, or an input/output controller.

11. An apparatus for computing, comprising:
a printed circuit board (PCB);
a first device, having a root complex circuitry, disposed in the PCB, the root complex circuitry including a port manager and a downstream port operable in accordance with a first or a second protocol, the first protocol having more functionalities than the second protocol, and
a switch disposed on the PCB, separate and distinct from the first device, and coupled to the root complex circuitry of the first device, the switch including an upstream port operable in accordance with either the first or the second protocol, and a downstream port operable in accordance with at least the second protocol;
wherein the port manager of the root complex circuitry of the first device is to detect whether the root complex circuitry is under a first link condition or a second link condition, where to detect whether the root complex circuitry is under the first link condition, the port manager is to detect whether the root complex circuitry is coupled to the switch which in turn is coupled to a second device disposed or coupled to the PCB, a first link between the downstream port of the root complex circuitry and the upstream port of the switch is compatible to the first protocol, and a second link between the downstream port of the switch and an upstream port of the second device is compatible to the second protocol, the second device being separate and distinct from the first device and the switch, and wherein to detect whether the root complex circuitry is under the second link condition, the port manager is to detect whether the first link between the downstream port of the root complex circuitry and the upstream port of the switch is compatible to the first protocol, without the second link between the downstream port of the switch and the upstream port of the second device being compatible to the second protocol; and wherein on detection of the first link condition, the port manager is to operate the downstream port of the root complex circuitry according to the second protocol, and on detection of the second link condition, the port manager is to operate the downstream port of the root complex according to the first protocol, wherein the downstream port of the root complex circuitry has a first set of dedicated registers in a memory mapped input-output address space of the root complex circuitry, and a first set of dedicated buses for the first link between the downstream port of the root complex circuitry and the upstream port of the switch, wherein the port manager is to assign, on detection of the first link condition, the first set of dedicated registers disposed in the root complex circuitry and the first set of dedicated buses disposed in the root complex circuitry to a communication channel between the downstream port of the root complex circuitry and the upstream port of the second device via the switch that couples the first and second devices, having the first link between the downstream port of the circuitry and the upstream port of the switch, and the second link between the downstream port of the switch and the upstream port of the second device, to facilitate exchange of one or more messages between the root complex circuitry and the second device following the second protocol.

12. The apparatus of claim 11, wherein the first device further comprises:

a processor or a central processor unit (CPU) coupled to the root complex circuitry; and a memory device coupled to the root complex circuitry.

13. The apparatus of claim 11, wherein the port manager is further configured to facilitate, on detection of the first link condition, exchange of the one or more messages between the root complex circuitry and the second device following the second protocol on the communication channel including the first link between the downstream port of the root complex circuitry and the upstream port of the switch, and the second link between the downstream port of the switch and the upstream port of the second device.

14. The apparatus of claim 11, wherein the port manager is further configured to:

manage the transmission of the one or more messages between the downstream port of the root complex circuitry and the upstream port of the second device following the second protocol, using a second set of dedicated registers in the switch and a second set of dedicated buses of the upstream port of the switch for communication through the first link, and a third set of dedicated registers in the switch and a third set of dedicated buses of the downstream port of the switch for communication through the second link.

15. The apparatus of claim 11, wherein the first protocol is Compute Express Link (CXL) 2.0 protocol, and the second protocol is CXL 1.1 protocol, CXL 1.0 protocol, or Peripheral Component Interconnect Express PCIe protocol; and wherein the second device includes a mouse, a disk, a keyboard, a memory device, or an input/output controller.

* * * * *